Figure 1:
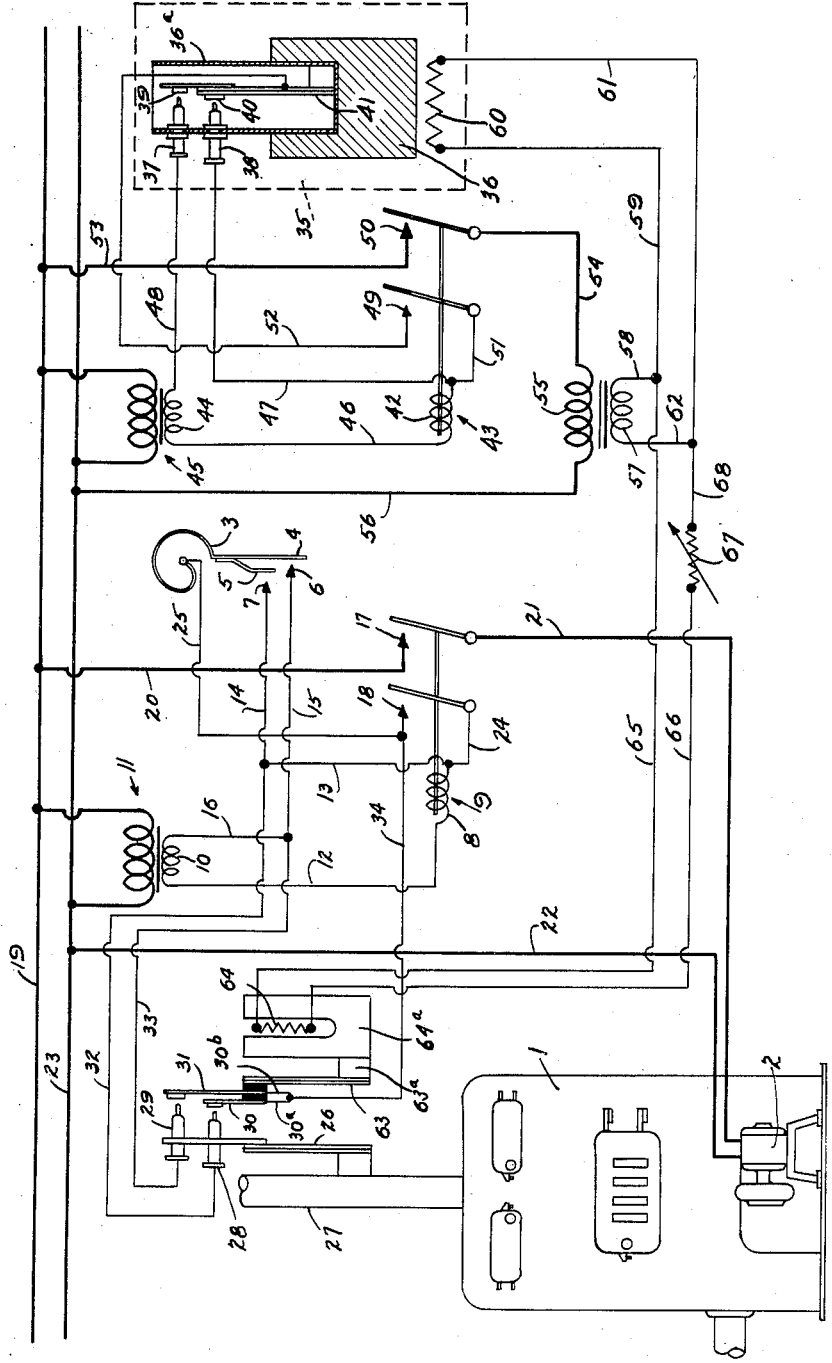

April 21, 1936.  D. G. TAYLOR  2,038,067
CONTROL SYSTEM
Filed July 2, 1932  2 Sheets-Sheet 1

INVENTOR
DANIEL G. TAYLOR
By Paul, Paul & Young
ATTORNEYS

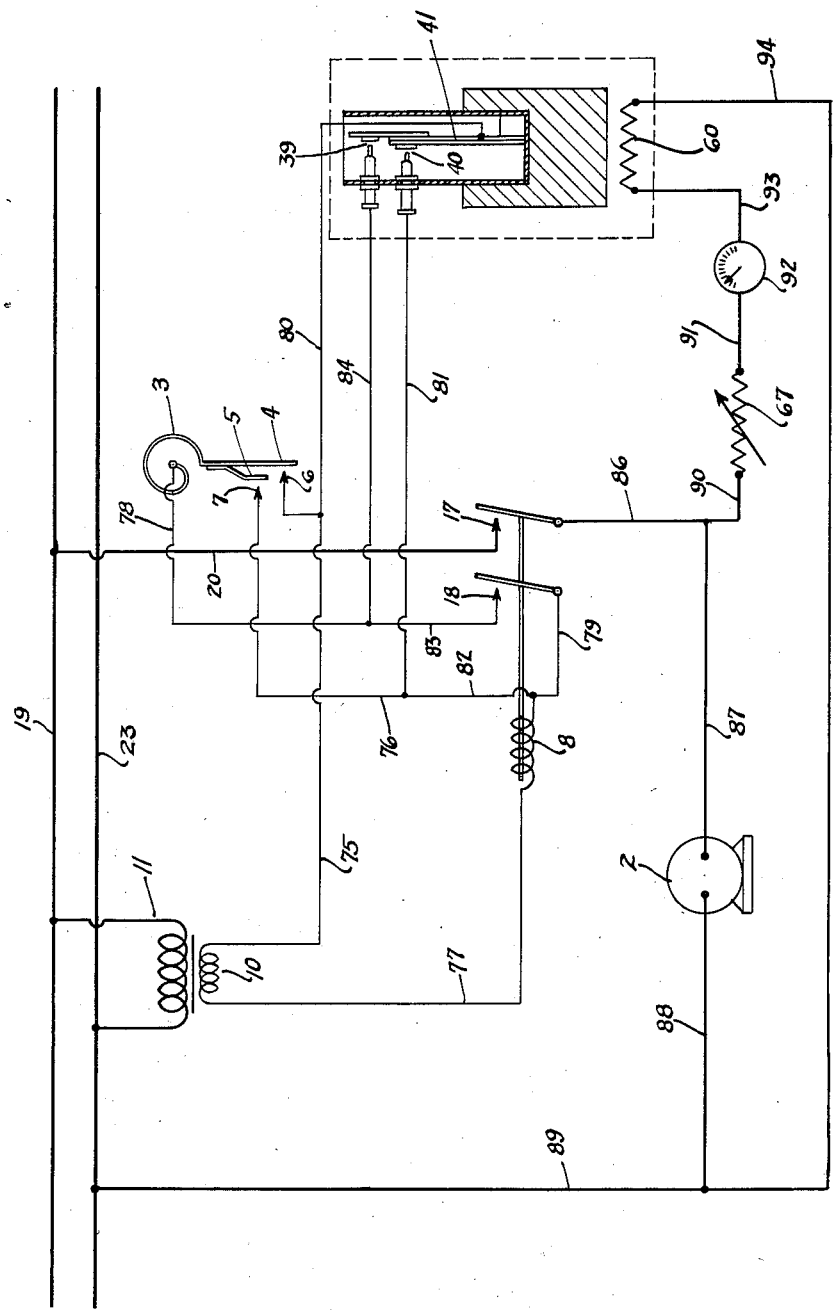

Patented Apr. 21, 1936

2,038,067

UNITED STATES PATENT OFFICE 2,038,067

CONTROL SYSTEM

Daniel G. Taylor, Minneapolis, Minn., assignor to Minneapolis-Honeywell Regulator Company, Minneapolis, Minn., a corporation of Delaware Application July 2, 1932, Serial No. 620,627

3 Claims. (Cl. 236—91)

This invention relates to the control of heating plants, directly in conformity to outdoor atmospheric conditions, and is generally related to my copending application for Temperature control method and means, Serial Number 512,887, filed February 2, 1931.

The invention includes the control of a limit switch for a furnace, in which the switch contacts are automatically adjusted, so that the switch closes at higher and higher temperatures conformably to increased heat loss occasioned by changes in outdoor conditions, such as outdoor temperature, wind velocity and direction and position of the sun.

It has heretofore been common practice to attempt to maintain the proper indoor temperature either by means of the thermostatic elements located in the rooms, or by one such element located indoors and another outdoors. The principal disadvantage of this system is that it cannot respond to an increased heat loss, due to wind. Using an ordinary thermostatic device located out of doors, such a device registers a certain temperature, whether the wind is or is not blowing. The present invention provides means for calibrating a limit switch accurately in response to additional heat loss within the building due to wind, as well as in response to other temperature-affecting meteorological conditions.

Objects, features and advantages of the invention will appear in the description of the drawings forming a part of this application, and in said drawings Figure 1 is a diagrammatic view showing one embodiment of the invention; and Figure 2 is a diagrammatic view showing a second embodiment.

In the drawings, numeral 1 indicates a furnace of any preferred type, 2 indicates a motor for controlling combustion of the furnace. The motor 2 is symbolic of any heat producing or controlling means. The motor is operated through a relay generally indicated at 9, the coil of the relay being indicated at 8. This relay is operated from main lines 19 and 23 through a stepdown transformer 11, the secondary of which is indicated at 10. The bimetallic element of a room thermostat is indicated at 3 and through blades 4 and 5, this thermostat controls contacts 6 and 7. Suitable wiring connections between the thermostat, source 10 and relay coil 8 obtain control of the coil through the thermostat. These wiring connections are referred to in detail under the heading "Operation". The relay controls two contacts respectively indicated at 17 and 18. Contact 17 controls the circuit to the motor. Contact 18 establishes a holding circuit through the room thermostat for the coil 8.

A low limit control for the boiler or furnace is provided, and comprises a thermostat switch which is calibratable. One form of calibratable switching means is composed of a bimetallic element 26 supported, in this instance, by a riser 27. At the top of this element is connected a support which carries two adjustable contact posts 28—29. This thermostat switch thus has one part of its contact mechanism movable by bimetallic element 26, only in response to the temperature of the riser. The other or complementary part, or contact mechanism, of this switch, is movable only by a bimetallic element 63 which is suitably supported as at 63ª, to a metal block 64ª. The bimetallic elements 26 and 63 are so arranged that both move in the same direction to the left when heated and to the right when cooled. At the upper part of the element 63 are arranged two arms 30 and 31 which are insulated from one another and from the bimetallic element 63. Post 28 and arm 30 are engageable with one another, and post 29 and arm 31 are engageable with one another.

It is evident from the arrangement that bimetallic element 26, when sufficiently cool, moves contacts 28—29 toward the arms 30—31. On the other hand, it is evident that when bimetallic element 63 is heated, its arms 30—31 are moved toward contacts 28—29. The movement of the bimetallic element 63 is initiated by suitable heating means, in this instance resistance coil 64, which applies heat to the metal block 64ª.

In this embodiment of the invention, the calibratable switch just described, which here functions as a limit switch, is adapted to have its contacts adjustably spaced or calibrated conformably to the amount of heat loss from the control box or enclosure located outside of the building. The heat losses in this control box are dependent on the same general meteorological conditions as the heat loss in the building. The object here is to control the heating plant independently of the room thermostat, or in conjunction therewith, in conformity with outdoor atmospheric conditions, to the end that the proper temperature level may be maintained within doors, even though the heat loss from the building may be increased, due to wind, for example.

The control box or station, of relatively small volume, is indicated by dotted lines at 35. Within the box is a metal block 36, or a block of heatabsorbing and heat-radiating material. A heater 60 is provided for heating the block to compensate for heat losses therefrom, and to maintain a temperature which has some predetermined relation to the temperature of the building, or to the average temperature of the rooms in the building.

Within this control box 35 and arranged within a socket in the top of the block 36 is a tube 36ᵃ which projects upwardly beyond the block. Within the tube is arranged a bimetallic thermostatic element 41 controlling contacts 40—39. Through the wall of the tube 36ᵃ pass adjustable contact posts 38—37 respectively engageable by the contacts 40—39. It will be understood that the block 36 and its associated elements are protectingly housed, but not in a manner to prevent proper meteorological action upon the block, that is does not prevent moving air from affecting the block to cause additional heat loss therefrom. It is conceivable that the block can be dispensed with and that the heater 60 may heat the relatively small control box, and affect its temperature which, in turn, will affect the temperature of the bimetallic element, to operate the switch.

The thermostatically operable switching means acts through suitable wiring connections to operate a relay 43 which, in turn, controls contacts 49—50 respectively providing a holding circuit for the coil 42 of the relay, and obtaining energization of the primary 55 of a step-down transformer, the secondary 57 of which is so connected as to simultaneously energize the heaters 60 and 64 when the relay 43 closes.

The resistance heating elements 60—64 are in parallel with the source 57, and means is provided for adjusting the ratio between the heat out-puts of the heating means 60 and 64. This variation is controlled by variable resistance 67.

Operation

The drawings represent the parts positioned as before a call for heat by the room thermostat, and with the limit switch open.

Call for heat by room

On sequential closure of contacts 6—7 by blades 4—5 of the thermostat 3 as the result of falling temperature or on a "call" for heat, coil 8 of relay 9 is energized through the following circuit; one side of secondary 10, 12, coil 8, 13, 14, contact 7, blade 5, blade 4, contact 6, 15, 16 to opposite side of secondary 10. As the result of energization of coil 8, contacts 17 and 18 are closed. Closure of contact 18 establishes a holding circuit for relay coil 8 as follows: 10, 12, coil 8, 24, contact 18, 25, 3, 4, 6, 15, 16 to opposite side of 10. The motor 2 is energized through the following circuit: hot line 19, 20, contact 17, 21, motor 2, 22, to ground line 23. The thermostat 3 remains closed until the room is sufficiently warm, and then opens, de-energizing the relay 8 and stopping the motor.

Call for heat by low limit control

Let us suppose that while the room thermostat is open, the temperature of the heating plant or furnace falls to some predetermined minimum for which the limit switch is set to close, the bimetallic blade 26 cools and moves to the right, and contacts 29 and 28 respectively and sequentially engage blades 31 and 30, with the result that coil 8 is energized independently of the room thermostat through the following circuit: secondary 10, 12, coil 8, 13, 32, 28, blade 30, wire 30ᵃ, wire 30ᵇ, blade 31, contact 29, 33, 16 to the opposite side of the secondary 10. The switches 17—18 are closed, the motor is started, and a holding circuit for the coil through the contacts of the limit switch is established as follows: 10, 12, coil 8, 24, contact 18, 34, 30ᵇ, 31, 29, 33, 16 to the opposite side of the secondary 10. As the furnace temperature increases, the riser temperature also increases and eventually the bimetallic element 26 moves to the left, first opening contact 28 and then contact 29. The disengagement of the latter contact de-energizes coil 8, opening switches 17 and 18 and again de-energizing the motor.

Calibration of limit control by outside weather conditions

Let it be assumed that the room thermostat has just opened and that, therefore, the operation of the furnace has just been stopped. Then assume that outside conditions change, to cause an additional heat loss from the space to be heated and from the control enclosure 35. The element 41 cools and moves to the left sequentially bringing contacts 39—40 respectively into engagement with posts 37—38. As the result of this switch closure, relay 42 is energized through the following circuit: one side of low voltage secondary 44, 46, relay coil 42, 47, post 38, contacts 40—39, posts 37, 48 to the opposite side of secondary 44. Relay contacts 49 and 50 close. Primary 55 is energized through the following circuit: hot line 19, 53, contact 50, 54, primary 55, 56, to ground line 23. A holding circuit for relay coil 42 is also established as follows: transformer secondary 44, 46, 42, 51, holding contact 49, 52, element 41, contact 39, post 37, 48 to opposite side of secondary 44.

As the result of energization of primary 55, secondary 57 is energized, and both heating coils 60—64 are simultaneously energized as follows: one side of secondary 57, 58, 59, heating coil 60, 61, 62 to opposite side of secondary, and one side of secondary 57, 58, 65, heating coil 64, 66, variable resistor 67, 68, 62 to the opposite side of secondary 57. Other means controlled by the temperature of the control box 35, can be used to increase the temperature of the box, and obtain calibration of the limit switch.

On sufficient energization of heater 64, blade 63 moves toward the left, moving contacts 30—31 respectively against contacts 28—29, and closing the circuit to the coil 8 independently of any action by the room thermostat 3. The motor 2 is again started and more heat is furnished. Various modifications of structure can be made without departing from the spirit of the invention, and various adjustments of the parts can be had, to change or even reverse the action phases of the control elements.

If the motor is being energized by action of the room thermostat and if, during that period, outside conditions such as wind should dissipate more heat from the block 36, or from the control box (in case the block is not used), the temperature of the control box is lowered, the control-box switch closes, heater 64 is energized, and the limit switch is closed to maintain heat producing operation of the furnace, even though the room thermostat may open. In this case, a calibration of the limit switch takes place which results in prolonging the operation of the motor, to prolong the production of heat for a length of time proportionate to the amount of heat dissipation from the building and block 36. However, it will be noted that as soon as contacts 39—37, 40—38 close, heater 60 is energized to apply more heat to the block to replace that dissipated, this heat will be maintained until such a time as the temperature of the block is sufficient to cause opening of contacts 40—38, 39—37 by movement of the bimetallic element 41 to the right.

Adjustment of the limit switch, to obtain higher limit closure, as the degree of heat dissipation (whether by wind or otherwise) from the control box increases, is the important feature of this invention. The limit switch is adjusted or calibrated in response to general meteorological conditions, including wind, as distinguished from adjustment only in response to temperature.

The control box thermostat so operates as to maintain substantially the same average temperature in the block, as that to be maintained in the building. The heat loss from the block increases and decreases in direct proportion to the heat loss from the building. It is possible, by adjusting the resistance 67 to so adjust the heat in-put to the block that the building will be maintained at a definite temperature, or that the heating plant will be operated in a definite way, no matter what the variations in outdoor temperature may be. The amount of in-put to the block will remain constant as long as the atmospheric conditions remain the same. However, in the case of wind, additional heat loss occurs which results in more quickly lowering the temperature of the box thermostat with the result that limit switch is closed more quickly to initiate an earlier operation of the heat supply apparatus. If, however, with a given heat in-put the outside temperature should rise, due to the heating effects of the sun, the block receives more outside heat and this is added to the heat supplied by the heater 60. Therefore, the box thermostat moves more quickly away to open the switch to reduce the length of the period of burner operation.

In case of a sharp temperature drop at night in a comparatively short length of time, the box thermostat starts the heating apparatus before the house begins to cool and thus anticipates the demand of heat by the house, inasmuch as the house is more slowly responding to the outside temperature drop. Thus the heat is being built up in the building so that long before it can assume the outside temperature or be unduly cooled, the radiators have acted to prevent such undue cooling.

For example, suppose the control box maintained at a temperature of 70 degrees has a heat loss of 100 B. t. u. per hour and that the building or compartments of the building, as a group, has or have a loss of 5000 B. t. u. per hour when the average temperature in the compartments is 70 degrees. It will then be necessary to supply 100 B. t. u. per hour to the control box and 5000 B. t. u. per hour to the compartments as a group. The apparatus will, therefore, be so proportioned as to obtain the desired results. These examples correspond to the lowest expected outside temperature and, of course, may be varied within wide limits.

In this system, a room thermostat may independently activate or de-activate the heating means, and the limit switch may correspondingly control the heating means, and further the limit switch is automatically calibrated to open at successively higher temperatures, according to increased wind velocity, and for decreased outdoor temperature, or in other words, the limit is raised and switch closure takes place sooner when the wind adds its effect, to dissipate heat from the building and from the control box.

By reason of the control system shown in Figure 1, two general modes of operation for controlling the temperature of the building are possible. First, the system may be so adjusted that the outdoor controller acts through the limit switch to vary the boiler water temperature to supply sufficient heat to the building to almost but not quite make up for the heat losses from the building as caused by varying outdoor atmospheric conditions. With such an adjustment, the room thermostat performs the room temperature controlling function to energize the building heating means to supply the additionally required heat to maintain the building temperature at the desired value. Second, the system may be so adjusted that the outdoor controller acts through the limit switch to control the building heating means to maintain the desired temperature within the building. The outdoor controller under such circumstances performs the main controlling function and the room thermostat acts as a low limit control to prevent lowering of the building temperature below a predetermined value in case of faulty operation of the system or inadvertent opening of doors or windows. These adjustments may be accomplished by either adjusting the variable resistance or rheostat 67, or by adjusting the contact setting of the outdoor controller, the room thermostat or the limit switch.

Another feature relates to the control of the heating plant directly in conformity to atmospheric conditions, and in conjunction with a room thermostat, with or without the use of the calibrated limit switch.

Referring to Figure 2, the means of the outdoor control station including the heater 60 may be so adjusted as to operate the heater 1 to maintain the temperature in the room or main enclosure slightly below the desired temperature, and the room thermostat is then so adjusted and connected as to cooperate with the means of the control station to compensate or make up for this small temperature difference. This may be considered a precautionary measure to eliminate possible "over-shooting" of the room temperature, and makes it unnecessary to adjust the control station heater 60 and the heater 1, for the space to be heated, quite so accurately, as is necessary when the room thermostat does not cooperate in the manner mentioned.

In other words the elements of the outdoor control inclosure may be so adjusted as to make the average temperature of the space to be heated less but not substantially less than the desired temperature, and then the room thermostat may be made to control the furnace independently of the outdoor controller to increase heat delivery sufficiently to give the desired temperature.

The control system of Figure 2 may also be adjusted so that the outdoor controller controls the building heating means directly to maintain the desired temperature within the building, and under such circumstances the outdoor controller performs the main controlling function and the room thermostat acts as a low limit control to prevent lowering of the building temperature below a predetermined value in case of faulty operation of the outdoor controller or in case of inadvertent opening of doors or windows.

These various modes of operation may be accomplished by appropriately adjusting the variable resistance or rheostat 67, or the contact settings of the outdoor controller and/or the room thermostat. Both modes of operation are contemplated by this invention.

The present form of the invention includes two heaters symbolically indicated at 2 and 60 which are, in this embodiment, simultaneously controlled by relay contact 17, connections with the relay being such that the relay or equivalent means is independently controllable either by the room thermostat contacts 6 and 7 or by the contacts 39 and 40 of the outdoor control. The wiring and other connections are referred to in detail under the heading "Operation".

*Operation*

On a call for heat by the room thermostat, contacts 6 and 7 sequentially close. The circuit for the relay coil 8 is traced as follows: one side of the secondary 10, wire 75, contact 6, 4 and 5 of the room thermostat, contact 7, wire 76, wire 82, coil 8, by wire 77 to opposite side of the secondary 10. On closure of the relay holding contact 18, the heater and motor control contact 17 is closed. The holding circuit for the room thermostat is then as follows: one side of secondary 10, 75, 6, 4, 3, 78, contact 18, 79 to 8, 77 to opposite side of the secondary 10.

When the outdoor control is operative and on a call for heat, 39—40 are closed, and the coil 8 is energized as follows: 10, 75, 80, 41, 40, 81, 82, 8, 77 to opposite side of secondary 10. Contacts 17 and 18 are closed. Contact 18 establishes a holding circuit for coil 8 through the contacts of the outdoor control device as follows: 10, 75, 80, 41, 39, 84, 83, 18, 79, coil 8, 77 to opposite side of secondary 10.

The contacts of the room thermostat and the contacts of the control station are wired in parallel with the coil of the relay and, therefore, either can assume control of the motor 2 (or heat supplying means for the space to be heated) and of the heater 60 of the control station device.

It is to be noted that contact 17 controls both of the heaters 2 and 60. The circuit through contact 17 for heater 2 is: 19, 20, contact 17, 86, 87, heater 2, 88, 89 to 23. The circuit for heater 60 is as follows: 19, 20, contact 17, 86, 90, variable resistance 67, 91, ammeter 92, 93, heater 60, 94, to 89 to 23.

The wiring connections between the room thermostat contacts 6 and 7, and the contacts 39 and 40 of the outdoor control device are such that either the room thermostat or the control station contacts can independently control the relay. In this way, the outdoor control means can so control the heaters 2 and 60 to cause the average temperature of the space to be heated to be slightly less than the desired value, and the thermostat can act to increase the amount of heat delivered to the space sufficiently to make up for this small difference.

I claim as my invention:
1. In a heating system for a building, the combination of a boiler for supplying heating fluid to the building, adjustable control means responsive to heating fluid temperature for controlling the operation of the boiler, a controller outside of the building capable of storing heat and having heating means and thermostatic means responsive to the temperature thereof, the thermostatic means controlling the heating means to maintain the temperature of the controller within predetermined limits and adjusting the adjustable control means, the arrangement being such that the heating fluid temperature is adjusted in accordance with outside atmospheric conditions including temperature, wind and solar radiation to supply sufficient heat to the building to make up for the heat losses from the building as affected by outside temperature, wind and solar radiation.

2. In a heating system for a building, the combination of means for supplying heating fluid to the building, adjustable control means responsive to the conditions of the heating fluid for controlling said supplying means, a control housing subject to the same atmospheric conditions as the building, the control housing including heating means and thermostatic means for controlling the heating means, the arrangement being such that sufficient heat is supplied to the control housing to maintain the temperature therein within predetermined limits regardless of the effects of wind, solar radiation or outside temperatures, and means operated by the thermostatic means for adjusting the adjustable control means to vary the condition of the heating fluid, whereby sufficient heat is supplied to the building to make up for the heat losses from the building regardless of the effects of outside temperatures, wind or solar radiation.

3. In a heating system for a building, the combination of means for supplying heating fluid to the building, adjustable control means responsive to the condition of the heating fluid for controlling said supplying means, a control housing subject to the same atmospheric conditions as the building, the control housing including heating means and thermostatic means for controlling the heating means, the arrangement being such that sufficient heat is supplied to the control housing to maintain the temperature therein within predetermined limits regardless of the effects of wind, solar radiation or outside temperatures, and means operated by the thermostatic means for adjusting the adjustable control means to vary the condition of the heating fluid, whereby sufficient heat is supplied to the building to make up for the heat losses from the building regardless of the effects of outside temperatures, wind or solar radiation, and means responsive to building temperature for additionally controlling said heating fluid supplying means.

DANIEL G. TAYLOR.